Nov. 26, 1946.    E. E. MOYER    2,411,744
ELECTRIC CONTROL CIRCUIT
Filed Oct. 29, 1941
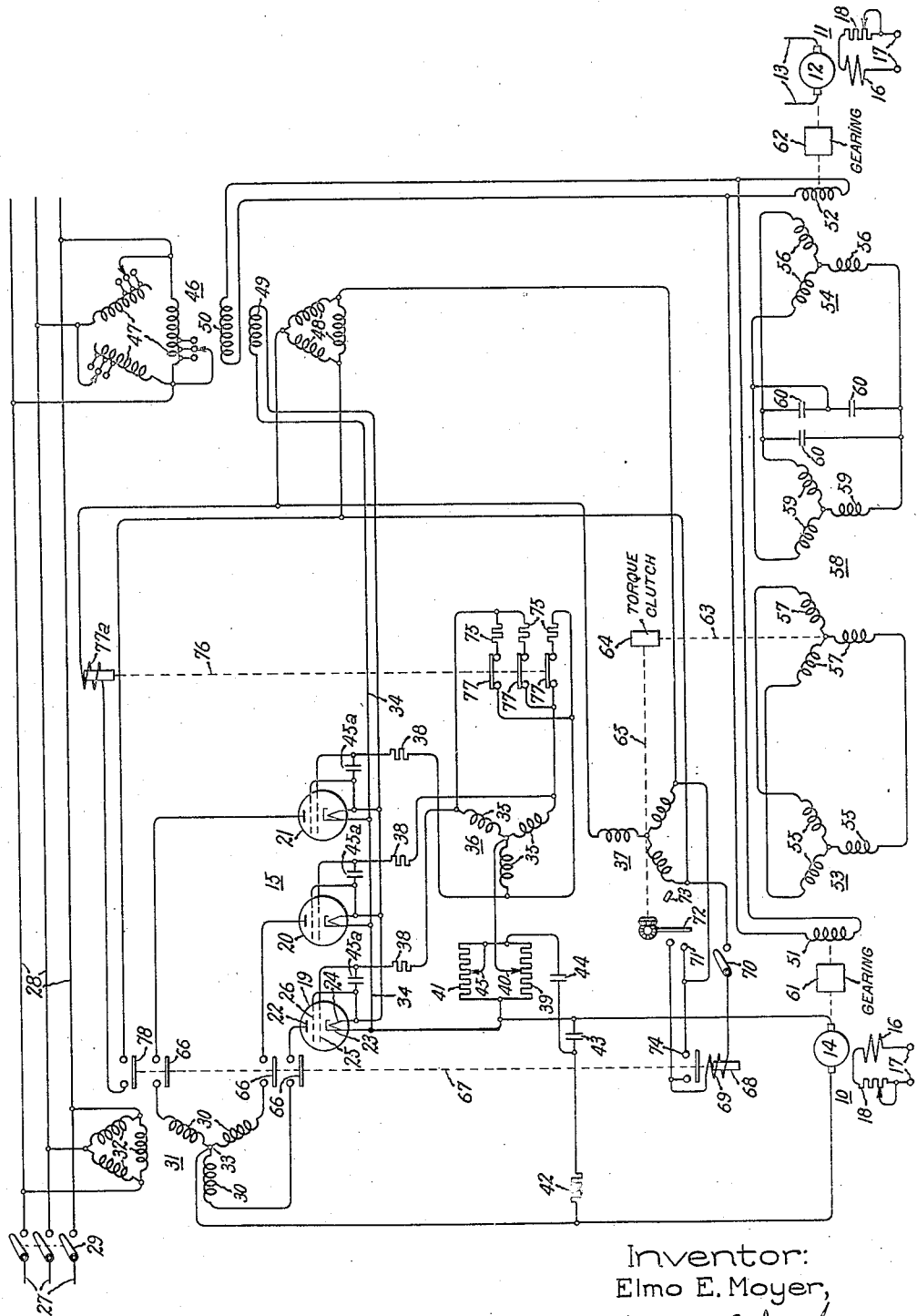
Inventor:
Elmo E. Moyer,
by Harry E. Dunham
His Attorney.

Patented Nov. 26, 1946

2,411,744

UNITED STATES PATENT OFFICE 2,411,744

ELECTRIC CONTROL CIRCUIT

Elmo E. Meyer, Scotia, N. Y., assignor to General Electric Company, a corporation of New York Application October 29, 1941, Serial No. 416,974

6 Claims. (Cl. 250—27)

My invention relates to electric control circuits and more particularly to improved electric control circuits for accomplishing variable energization of a load circuit, such as an electric motor, by the use of electric valve translating apparatus.

In control systems employing electric valve translating apparatus for effecting variable energization of a load circuit and particularly in systems where the load circuit comprises a motor which is to be maintained in some definite operative relation with respect to another motor, it is desirable to insure that the output of the electric valve apparatus is returned to a predetermined value each time the system is deenergized so that the initial energization of the load circuit is always the same. In systems of this character employed for controlling the energization of one of a plurality of motors to maintain the motors in definite speed relation by means of synchronous motion transmitting devices driven by the motors and operating to control the position of a movable element for varying the output of the electric valve means, it has been found that if the movable element is positively driven in accordance with the relative positions of the movable elements of the motion transmitting devices, uneven operation of the regulating system results if the speed relation of the motors continues to depart from the desired relation after the movable element of the valve controlling means has reached the limit of its movement. In order to overcome this difficulty I provide a connection between the motion transmitting devices and the movable element of the tube controlling means which permits the motion transmitting devices to remain in synchronism after the movable element of the control device has reached the limit of its travel. In this way a continued temporary departure of the desired relation between the movable elements and the motors after the movable element of the tube controlling means has reached the limit of its travel permits the motion transmitting devices to remain in synchronism and as soon as the speed relation approaches that desired and the motion transmitting devices tend to rotate the movable element of the controlling means in the opposite direction the control is picked up smoothly as contrasted with the sudden changes which occur if the motion transmitting devices temporarily lose synchronism with the rotating elements of the motors which are controlled.

It is an object of my invention to provide a new and improved electric control circuit.

It is another object of my invention to provide a new and improved electric control circuit for an electric valve translating apparatus for effecting variable energization of a load circuit which provides for a predetermined initial energization of the load.

It is still another object of my invention to provide a new and improved electric control system employing self-synchronous type motion transmitting devices which insures smooth regulating action under all operating conditions.

Briefly stated, in the illustrated embodiment of my invention I provide a controlled electric valve system for variably energizing the armature winding of an electric motor to maintain a predetermined speed relation between the motor and another motor which is not energized through the electric valve means. The control of the electric valve means to effect the desired variable energization is accomplished by means of motion transmitting devices including a differential motion transmitting device which is operatively connected with the rotor of a phase shifting device for controlling the excitation of the electric valve means. The connection between the rotor of the differential signal device and the rotor of the phase shifting device is accomplished by means of a torque clutch which permits synchronous movement of the differential device after the rotor of the phase shifting device has reached the limit of its movement. This provides for smooth functioning of the control at the time the desired speed relation is again attained and operating of the movable element of the phase shifting device within its effective range is resumed. In order to insure that the initial output of the electric valve apparatus is always the same upon energization of the anode-cathode circuit thereof, I provide means for automatically returning the rotor of the phase shifting device to a predetermined position upon deenergization of the anode-cathode circuit of the electric valve means and also provide means for preventing energization of the anode-cathode circuit until the rotor has been returned to the predetermined position. In order to improve the smoothness of action of the control system still further I provide an improved anti-hunting circuit including a resistor-capacitor combination responsive to voltages of the load circuit for modifying the excitation voltages applied to the electric valves. The anti-hunting circuit includes a pair of parallel resistors each of which is provided with a variable tap for varying the magnitude thereof so that it is possible to adjust independently the time constant of the condenser circuit and the magnitude of the resistance included in the control circuit.

My invention will be better understood by reference to the following description taken in connection with the accompanying drawing and its scope will be pointed out in the appended claims. In the drawing, the single figure is a schematic representation of one embodiment of my invention.

Referring now to the drawing, I have shown my invention embodied in a controlled electric valve system for variably energizing the armature windings of a direct current motor 10 to maintain a predetermined speed relation between the motor 10 and another direct current motor 11 which has the armature 12 thereof energized from a direct current supply 13 through a suitable motor starting and control circuit (not shown). The direct current motor 10 has the terminals of the armature 14 thereof connected in the direct current circuit of an electric valve rectifier illustrated generally by numeral 15. The motors 10 and 11 each include a field winding 16 energized from a suitable source of direct current 17 through a variable resistance 18.

As mentioned above the armature winding of the motor 10 is energized from the direct current circuit of an electric valve rectifier 15. As illustrated in the drawing the rectifier is a three-phase half-wave system comprising three electric valves 19, 20 and 21 each preferably of the type comprising a container enclosing an ionizable medium, such as a gas or vapor, and within which are mounted an anode 22, a cathode 23 and associated heater element 24, a control member or grid 25 and a shield grid 26. The particular type of valve illustrated is not essential to the present invention and any of the well known types of controlled electric valves may be employed, if desired. The anode-cathode circuits of the electric valves are energized from a three-phase alternating current supply circuit 27 which energizes an alternating current bus 28 under the control of a manual switch 29. The anodes of the electric valves 19, 20 and 21 are connected to the end terminals of a Y-connected secondary winding 30 of an anode transformer 31 having a delta-connected primary winding 32 connected to the alternating current bus 28. The direct current circuit of the rectifier is completed from the neutral connection 33 of the secondary winding 30 to one armature terminal of motor 10 and from the other armature terminal of the motor to the cathode bus 34 of the electric valves 19, 20 and 21. As is well understood by those skilled in the art the three-phase rectifier circuit described above is effective to supply direct current to the armature of the motor 10 at a voltage dependent upon the energization of the control members or grids 25 of the electric valves.

The control circuit for energizing the control members 25 to effect variable energization of the motor 10 will now be described. In the arrangement illustrated the motor 10 is intended to operate at a fixed speed relation with respect to the motor 11 as may be desired in many commercial applications such, for example, as in the case of a cable making equipment where motor 10, for example, may be the reel driving motor and the motor 11 may be the flyer motor or, in other words, the motor which controls the twist or lay of the cable. The conductivities of the electric valves 19—21 are controlled in accordance with the voltages of the phase terminals of the three-phase stator winding 35 of a phase shifting device 36 having a three-phase rotor winding 37. The phase shifting device 36 is of a type well known in the art and is similar in mechanical construction to a three-phase wound rotor induction motor. The circuit between the three phase terminals of the stator winding 35 and the respective control members 25 of valves 19, 20 and 21 is completed through current limiting resistors 38. The neutral terminal of the stator winding 35 is connected to the cathode bus 34 of the valves 19, 20 and 21 through a portion of a resistor 39 determined by the position of the slider 40. Resistor 39 and a parallel connected resistor 41 form part of an anti-hunting circuit which is operative to introduce by means of the portion of resistor 39 included in the circuit of the control members 25 a voltage dependent upon changes in voltage across the terminals of armature 14 of the machine 10. The anti-hunting circuit includes a resistor 42 and capacitor 43 connected in series across the terminals of the armature 14 and a capacitor 44 connected between the common point of resistor 42 and capacitor 43 and the terminal of parallel resistors 39 and 41 remote from the cathode bus 34. The condenser 44 for a given voltage of the armature 14 is charged to a predetermined value. Changes in the armature voltage result in a change in the charge of the capacitor 44 and the charging current flowing through resistor 39 introduces a direct current bias voltage in the circuit of control members 25 which affects the conductivity of the valves in a direction to oppose the change in armature voltage. The magnitude of the bias voltage for a given current flow through resistor 39 is controlled by the position of the slider 40 while the position of a short circuiting slider 45 on resistor 41 determines the total resistance of the parallel resistance combination 39 and 41 to determine the time constant of the discharge circuit of the anti-hunting capacitor 44. Capacitor 43 cooperating with resistor 42 operates as filter to remove a portion of the ripple from the voltage of the anti-hunting circuit. Capacitors 45a are connected between the respective control members 26 of electric valves 19, 20 and 21 and the cathode bus 34 and serve to minimize transient voltages on the control members and improve the controlling action thereof.

As previously mentioned, the motor 10 is variably energized to operate at a speed dependent upon the speed of the motor 11. The arrangement for controlling the position of the rotor 37 of phase shifting device 36 to accomplish this speed relation between motors 10 and 11 will now be described. A source of alternating current control voltage is derived from the alternating current bus 28 by means of a control transformer 46 having a primary network 47 comprising three phase windings provided with taps which may be adjusted to provide the desired magnitude of control voltage. The secondary network 48 provides a source of energizing voltage for the rotor winding 37 of the phase shifting device 36. The transformer is also provided with secondary windings 49 and 50. Winding 49 provides a source of energy for heating the cathode heaters 24 of electric valves 19, 20 and 21 and the secondary 46 provides a source of voltage for energizing the rotor windings 51 and 52 of angular motion transmitting devices 53 and 54 respectively. The devices 53 and 54 are provided with three phase Y-connected stator windings 55 and 56 respectively with the phase terminals of stator winding 55 connected with the phase terminals of the three phase rotor winding 57 of a differential motion transmitting device 53 while phase terminals of the winding 56 are connected with the phase terminals of the polyphase stator winding 59 of the differential motion transmitting device 58. Capacitors 60 are connected across the stator terminals of the differential device and are of such a rating that they take a leading excitation current equal to the lagging excitation current required by the differential device with the result that the exciting current which must be supplied to the differential by the device 53 for example, is equal only to the power component of the current which is in general only a small portion of the total excitation current.

As illustrated in the drawing, the rotor winding 51 of device 53 is coupled to the shaft of motor 10 by means of suitable gearing designated by the numeral 61 and the rotor 52 of device 54 is mechanically coupled to the shaft of motor 11 by suitable gearing 62. This gearing is arranged so that the speed of rotation of windings 51 and 52 are equal when the desired speed relation between the motor 10 and the motor 11 exists. As is well understood the Selsyn system including devices 53, 54 and 58 operate to produce a torque on the rotor 57 dependent on the displacement between windings 51 and 52. For example, if windings 51 and 52 are in equilibrium position no torque is produced on winding 57. However, a change in speed of one of the motors from the desired speed with respect to the other motor causes a relative displacement of the windings 51 and 52 and torque is produced on winding 57 dependent on the magnitude and direction of the relative displacement of the windings 51 and 52. As illustrated in the drawing, the rotor winding 57 is mechanically coupled by means of a shaft 63 to a torque clutch illustrated schematically at 64 which has the output shaft 65 thereof connected with the rotor of the phase shifting selsyn 36. The torque coupling provides what under normal operation is a positive drive of the rotor of the phase shifting device 36 but which permits continued rotation of the differential selsyn after the phase shifting rotor has reached the limit of its travel. This arrangement allows the differential selsyn to continue to rotate in the event that the departure from the desired speed relationship between machines 10 and 11 is not immediately corrected by control of the electric valves 19 to 21 before the winding 37 reaches one of its extreme positions.

With the motor control system illustrated it is desired that the electric valves 19, 20 and 21 have their anode-cathode circuits energized and that the control circuit therefor be adjusted so that the output voltage is insufficient to rotate the reel motor 10 until after the motor 11 has been started. Preferably the minimum output of the valves is sufficient to produce considerable torque in the reel but insufficient to rotate it. To this end means are provided for insuring that the rotor 37 of the phase shifting device 36 is returned to the position of minimum output of the electric valves when the anode-cathode circuits of the electric valves are deenergized and for preventing the energization of the anode-cathode circuits until the rotor has been returned to the position corresponding to minimum output voltage of the electric valve rectifier. Referring again to the drawing, the anode circuit of the valves 19, 20 and 21 are controlled by the movable contacts 66 of an anode contactor 67 having an operating electromagnet 68 including an operating coil 69. The coil 69 is connected to be energized from one phase of the transformer secondary network 48 through a manually controlled switch 70 and a pair of spaced fixed contacts 71 which are bridged by a conducting member 72 when the phase shifting device is in the position of minimum output of the electric valves. The cooperating contacts 71 and 72 also provide a mechanical stop for the rotor of the phase shifting circuit. A mechanical stop 73 is provided to limit the movement of the rotor winding 37 in the opposite direction. It is apparent that these stops may be adjusted in angular position to determine the minimum and maximum output of the electric valve means. A variable contact 74 actuated by the relay 68 completes a circuit in parallel with the contacts 71 to provide a holding circuit for the coil 69 after it has moved the contacts 66 to closed position.

The rotor 37 of the phase shifting device 36 has an inherent tendency to rotate in a direction to reduce the output of the electric valves 19, 20 and 21. In order to utilize this tendency to restore the phase shifting device to the position of minimum output when the anode-cathode circuit of electric valves are deenergized, I provide means for loading electrically the stator winding with impedance elements such as resistors 75 in response to opening movement of the contacts 66. As illustrated in the drawing, this is accomplished by means of a switching device 76 having movable contacts 77 for connecting one of the resistance elements 75 in circuit between each pair of terminals in the stator winding 35 of the device 36. The device 76 is provided with an actuating coil 77a connected to be energized from one phase of the control power supply transformer secondary 48 through a circuit including a movable contact 78 on the anode contactor 67. From an inspection of the circuit of coil 77 it is seen that it is electrically connected with the transformer secondary winding 48 whenever the anode contacts 66 are closed. In this way the resistors 75 are automatically disconnected from the stator winding of the phase shifting device 36 when the anode leads of the electric valves 19, 20 and 21 are closed by closure of contacts 66. When the rotor 37 of the device 36 is energized from the supply circuit 28 this loading of the stator increases the torque tending to rotate the phase shifting device to the position of minimum output of the electric valves and to maintain the same in that position with the cooperating contacts 71 and 72 operating as a mechanical stop against which the rotor is held.

Although the operation of the various elements of the system described above has been described during the description, it is believed that the features and advantages of the present invention will be more apparent from a brief consideration of the operation of the system as a whole. Let it be assumed that switches 29 and 70 are open and that both motors 10 and 11 are at standstill. If it is desired to start the system, switch 29 is first closed energizing transformer 46 and the rotor winding of phase shifting device 36. The selsyns 53 and 54 are also energized and the cathode heater elements of the electric valves 19, 20 and 21 are energized. The contacts 71 are normally closed and resistors 75 are thereby connected across the terminals of the stator windings 35 of the phase shifting device 36, thus increasing the torque produced on the rotor to insure that it is rotated to the position of minimum output and that movable contact 72 is closed on contact 71. After the cathode heater elements are at operating temperature, preferably insured by a time delay relay (not shown) having a contact in circuit with switch 70, the switch 70 is closed and coil 69 of relay 68 is energized from one phase of winding 48 through the contacts 71 and 72 of the limit switch associated with the phase shifting device 36. As soon as relay 68 picks up, contact 78 is closed to complete a circuit for coil 77a to operate contacts 77 to open circuit position and disconnect one terminal of each of the resistors 75 from the stator winding 35. The contacts 66 in the anode leads are closed and the contact 74 in parallel with contacts 71 and 72 is closed to complete a holding circuit for the coil 69. The tube circuit is now in operating condition and will function to impress a variable voltage on the armature winding of motor 10 dependent upon the relative position of windings 51 and 52 of the devices 53 and 54 respectively. The next step in the operation is the starting of the motor 11 which is brought up to operating speed by any suitable starting circuit (not shown). As motor 11 starts to rotate winding 52 will move with respect to winding 51 and in this way produce a torque on winding 57 which is transmitted to rotate the movable element of phase shifting device 36 in a direction to increase the output voltage of the electric valve rectifier and in this way cause the reel motor 10 to start rotating. The torque imparted to the winding 57 and its associated structure is always in a direction to rotate the movable element 37 in a direction to effect the change in the impressed voltage on the armature of motor 10 necessary to change its speed in the proper manner to bring the elements 51 and 52 into the correspondence and in this way to maintain the desired speed relation between motors 10 and 11.

Inasmuch as movement of the rotor 37 of the phase shifting device 36 to one of its extreme positions may fail temporarily to restore the desired positional relation between the movable elements of motors 10 and 11, it is desirable to provide for relative movement between the winding 57 of the differential motion transmitting device 58 and the rotor 37. To this end the torque clutch 64 interposed between the winding 57 and the winding 37 permits relative movement of these windings when the torque required to rotate winding 37 exceeds a certain value. The clutch is adjusted so that the windings 37 and 57 are maintained in fixed relation to each other as long as winding 37 is not against the stops provided by contacts 71 and 72 at one limit of travel and the mechanical stop 73 at the other limit of travel. In this way the system including motion transmitting devices 53, 54 and 58 are allowed to remain in synchronous relation so that as the elements of the motors 10 and 11 approach the desired relationship and the phase shifting device 37 is to be moved away from its extreme position the devices 53, 54 and 58 are functioning smoothly and the winding 57 is not operating unevenly as it would tend to if it were resynchronizing after having been out of step with the remainder of the motion transmitting system. Claims including this feature of interconnecting the motion-transmitting system with the phase-shifting device by means which permits relative movement therebetween when the force required to move the phase-shifting device exceeds a predetermined amount are presented in a divisional application, Serial No. 477,031, filed February 25, 1943.

In order to prevent hunting of the regulating system the circuit including resistor 42, capacitor 44 and parallel resistors 39 and 41 are connected across the armature terminals of the motor 10. The capacitor 44 tends to have a charge dependent upon the voltage of motor 10. Any change in this voltage produces a change in the condenser charge at a rate dependent upon the time constant of the condenser resistor circuit. The resistor 39 is connected in the circuit of the control members 25 so that the polarity of the voltage caused by a change in the condenser charge is in a direction to oppose the change in voltage of the armature machine 10 causing the change in the condenser charge. In this way overshooting of the system is prevented and a smooth regulating action obtained. The slider 45 controls the magnitude of resistance in circuit with condenser 44 and in this way controls the time constant of the condenser circuit. The slider 40 controls the portion of resistor 39 in the control circuit and in this way controls the magnitude of the anti-hunting voltage for a given current through resistance element 39. Condenser 43 cooperates with resistor 42 to provide a filter to remove some of the ripple from the anti-hunting voltage. The tendency of the regulating system to hunt may also be decreased by the introduction of reduction gearing between the rotor 57 and rotor 37 of the phase shifting device. The gearing may be incorporated in the clutch unit 64 if desired.

When it is desired to shut down the motors, motor 11 is first deenergized and brought to a standstill by dynamic breaking if desired and with the control circuit for motor 10 functioning in this way the motor 10 follows motor 11 to standstill at which time switch 70 is opened. Upon opening of the control switch 70 coil 69 of the anode contactor operating relay 68 is opened to deenergize the anode-cathode circuits of the electric valves 19, 20 and 21. Contact 78 is also opened to deenergize the winding 77a of the relay 76 thus allowing contact 77 to close and connect resistors 75 across the stator winding 35 of the phase shifting device 36. As described above this insures that the winding 37 is returned to the position of minimum output against the stops provided by contacts 71 and 72 and places the system in position to be again operated. If the shutdown is for a long period the contact 29 may be opened and the system completely deenergized.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, electric translating apparatus energized from said circuit and including electric valve means having a control member for controlling the conductivity thereof, a control circuit for controlling the energization of said control member including phase shifting means including an element movable to vary the phase of the output voltage thereof and thereby to vary the output of said electric valve means, means for deenergizing said electric translating apparatus, and means responsive to the deenergizing operation of said last mentioned means for returning said movable element to a position corresponding to the minimum output of said valve means.

2. In combination, a supply circuit, electric translating apparatus energized from said circuit and including electric valve means having a control member for controlling the conductivity thereof, a control system for controlling the energization of said control member including a phase shifting device having an element movable to vary the phase of the output voltage thereof thereby to vary the output of said valve means, means operative to return said movable element to a position corresponding to the minimum output of said valve means in response to deenergization of said translating apparatus, and means preventing energization of said translating apparatus when the movable element of said phase shifting device is in any but the position corresponding to minimum output of said electric valve means.

3. In combination, a supply circuit, a load circuit, electric translating apparatus interconnecting said circuits and including electric valve means having a control member associated therewith for controlling the conductivity thereof, a control circuit for controlling energization of said control member including phase shifting means having an element movable between extreme positions to vary the output of said electric valve means between a minimum and a maximum, switching means for controlling the connection of said translating apparatus with one of said first two named circuits, and means operated in response to the circuit interrupting position of said switching means for returning the movable element of said phase shifting means to the position corresponding to minimum output of said electric valve means.

4. In combination, a supply circuit, a load circuit, electric translating apparatus interconnecting said circuits and including electric valve means having a control member for controlling the conductivity thereof, a control circuit for controlling the energization of said control member including a phase shifting device having relatively rotatable windings operable to extreme positions for varying the output of said electric valve means between a minimum and a maximum, said relatively rotatable windings having an inherent tendency to rotate in a direction to reduce the output of said electric valve means to a minimum, and means responsive to a change in an operating condition of said translating apparatus for electrically loading one of said windings to increase the tendency of said windings to rotate to a position corresponding to the minimum output of said electric valve means.

5. In combination, a supply circuit, a load circuit, electric translating apparatus interconnecting said circuits and including electric valve means having a control member for controlling the conductivity thereof, a control circuit for controlling the energization of said control member including a phase shifting device having relatively movable windings movable between extreme positions for varying the output of said electric valve means between a minimum and a maximum, at least one of said windings being a polyphase winding, impedance means, circuit controlling means for connecting said impedance means with one of the windings of said phase shifting device, switching means for interrupting the circuit between said translating apparatus and said supply circuit, said circuit controlling means being operable in response to operation of said switching means to open circuit position to connect said impedance means with said winding and thereby causing said relatively movable windings to move to a position corresponding to minimum output of said electric valve means.

6. In combination, a supply circuit, a load circuit, electric translating apparatus interconnecting said circuits and including electric valve means having a control member for controlling the conductivity thereof, a control circuit for controlling the energization of said control member including a polyphase phase shifting device having relatively movable windings movable between extreme positions for varying the output of said electric valve means between a minimum and a maximum, and a plurality of resistance elements, switching means for connecting said resistance elements between the phase terminals of one of the windings of said phase shifting device, switching means for controlling the energization of said electric valve means from said supply circuit, and means operable in response to operation of said second named switching means to a position to deenergize said electric valve means to operatively connect said resistance elements to one winding of said phase shifting device to electrically load said device and cause said windings to move to a position corresponding to the minimum output of said electric valve means, and means preventing operation of said second switching means to energize said valve means except when said phase shifting device is in a position to produce minimum output of said electric valve means.

ELMO E. MOYER.